United States Patent [19]

Bjerge et al.

[11] Patent Number: 5,655,099
[45] Date of Patent: Aug. 5, 1997

[54] ELECTRONIC DEVICE WITH MICROPROCESSOR AND BANKED MEMORY AND METHOD OF OPERATION

[75] Inventors: Claus Bjerge, Haarlev; Jan Frlls Hansen, Lyngby, both of Denmark

[73] Assignee: Motorola, Inc., Schaumburg, Ill.

[21] Appl. No.: 417,348

[22] Filed: Apr. 5, 1995

[30] Foreign Application Priority Data

Apr. 29, 1994 [GB] United Kingdom ............... 9408552

[51] Int. Cl.$^6$ ............................................. G06F 12/00
[52] U.S. Cl. ................................... 395/405; 395/402
[58] Field of Search ............................. 395/401, 405, 395/402

[56] References Cited

U.S. PATENT DOCUMENTS

| | | | |
|---|---|---|---|
| 4,713,759 | 12/1987 | Yamagishi et al. | 364/200 |
| 5,146,581 | 9/1992 | Kaneko | 395/425 |
| 5,226,136 | 7/1993 | Nakagawa | 395/425 |
| 5,276,831 | 1/1994 | Nakanishi et al. | 395/425 |

FOREIGN PATENT DOCUMENTS

| | | |
|---|---|---|
| 330 226 A2 | 8/1989 | United Kingdom . |
| 0330226 | 8/1989 | United Kingdom ............. G06F 9/40 |

*Primary Examiner*—Alvin E. Oberley
*Assistant Examiner*—Kakali Chaki
*Attorney, Agent, or Firm*—M. Mansour Ghomeshi

[57] ABSTRACT

An electronic device is described having a microprocessor (100) and banked memory (otherwise known as virtual memory, 15, 16) as well as a method of operation of a such a device. A selected program is run from a first banked memory (15). An access program is loaded from the running program into common RAM (11). The access program is run from common RAM and actuates a memory switch (121) to disconnect the first banked memory from the microprocessor and to connect in its place a second banked memory (16). Memory access operations are performed to the second banked memory. The access program activates the memory switch to disconnect the second banked memory and to reconnect the first banked memory and running of the selected program is recommenced. By storing the access program in RAM, there is less usage of valuable common memory space.

2 Claims, 3 Drawing Sheets

ELECTRONIC DEVICE WITH MICROPROCESSOR AND BANKED MEMORY AND METHOD OF OPERATION

FIELD OF THE INVENTION

This invention relates to an electronic device having a microprocessor and banked memory (otherwise known as virtual memory). The invention also relates to a method of operation of a such a device.

BACKGROUND TO THE INVENTION

Electronic devices, such as two-way radios, but including many consumer goods, are frequently controlled by microprocessors with a limited address range (typically 64K addresses). The address range is limited by the address bus width of the microprocessor.

A technique used for extending the addressable memory in a microprocessor based device is the technique of "virtual memory" addressing or "bank switching" of memory. This technique expands the memory space available and thereby the programmable functionality of the device and is popular in view of the relatively low cost of memory space. Such a technique is described, for example, in GB patent application no. 9319625.1 now Patent No. GB 9319629 of Motorola Inc., incorporated herein by reference.

In the use of bank switched memory, a region of address space addresses a memory bank, where the particular memory bank that is addressed is determined by a hardware switch. Address space which does not address the banked memory is "common" address space.

When considering the total memory map of a microprocessor, it is typical to allocate some common memory address space to random access memory (RAM) and some common address space to read only memory (ROM). The address space which addresses the bank switched memory can address RAM or ROM, depending upon the type of memory switched by the hardware switch, though it is typically ROM memory.

If a program placed in one bank has to activate programs or read/write data in another bank, it has to do this via an "access program" located in the common memory space (the un-banked memory space). This sometimes gives a heavy consumption of the common memory space by these access programs, by locating the whole commonly used program or data in the common memory space. As the functionality to be designed into the device increases, there is a greater burden on the fixed amount of common memory space available.

There is a need to reduce the usage of common memory space whilst enabling increased functionality through provision of programs or data in banked memory.

SUMMARY OF THE INVENTION

According to the present invention, a method of operating an electronic device is provided having a microprocessor, a common random access memory (RAM), a plurality of banked memories and a memory switch for connecting selected ones of the bank switched memories to the microprocessor for addressing by the microprocessor. The method comprises the steps of: running a selected program from a first banked memory; loading an access program from the running program into common RAM, running the access program from common RAM, where the access program actuates the memory switch to disconnect the first banked memory from the microprocessor and to connect in its place a second banked memory, performing memory access operations to the second banked memory, continuing running of the access program, where the access program activates the memory switch to disconnect the second banked memory and to reconnect the first banked memory, and recommencing running of the selected program.

By these means, it is not necessary to store permanently in common memory space the specific access program for switching to and from specific banked memory space. To the contrary, the access program can be stored in RAM until it has served its function of addressing a particular banked memory.

It should be noted that, by virtue of loading the access program into common RAM memory, the access program is itself not hidden or "shadowed" by the bank switching operation. This is important in order to enable the program to revert back to a previous memory switch position in order to revert to the previous program being run.

In another aspect of the invention, an electronic device is provided having a microprocessor, a common random access memory (RAM), a plurality of banked memories and a memory switch for connecting selected ones of the bank switched memories to the microprocessor for addressing by the microprocessor via banked memory address space. In this device, a first banked memory comprises a first program; the microprocessor comprises program scheduling means arranged to select and run the first program from the first banked memory; the first program includes an access program and the access program comprises instructions for (a) activating the memory switch to disconnect the first banked memory from the microprocessor and connect a second banked memory thereto (b) for performing memory access operations or program running to or from the banked memory address space and (c) for disconnecting the second banked memory and reconnecting the first banked memory; instructions are provided for loading the access program into common RAM, and the scheduler is arranged to run the access program from the common RAM when the assess program has been loaded into the common RAM.

The access program preferably comprises (a) instructions to switch to a defined bank of banked memory and (b) memory access instructions for accessing that banked memory, where a number defining a bank of memory is an object of the instructions to switch, and where an address within the banked memory is an object of the memory access instructions.

In a preferred feature, the RAM is, upon start up, initiated with the instructions to switch and the instructions for memory access, as well as a predefined bank number and a predefined memory address.

In a preferred feature, upon subsequent bank switching operations, only the object of the bank switching instructions and the object of the memory access instructions are loaded into RAM memory. This feature minimises the data transfer operations required on each bank switching operation, that is to say this feature avoids the need to load the complete memory access program from bank switched memory into RAM.

A preferred embodiment of the invention will now be described, by way of example only with reference to the drawings.

DETAILED DESCRIPTION OF THE DRAWINGS

Figure 1:
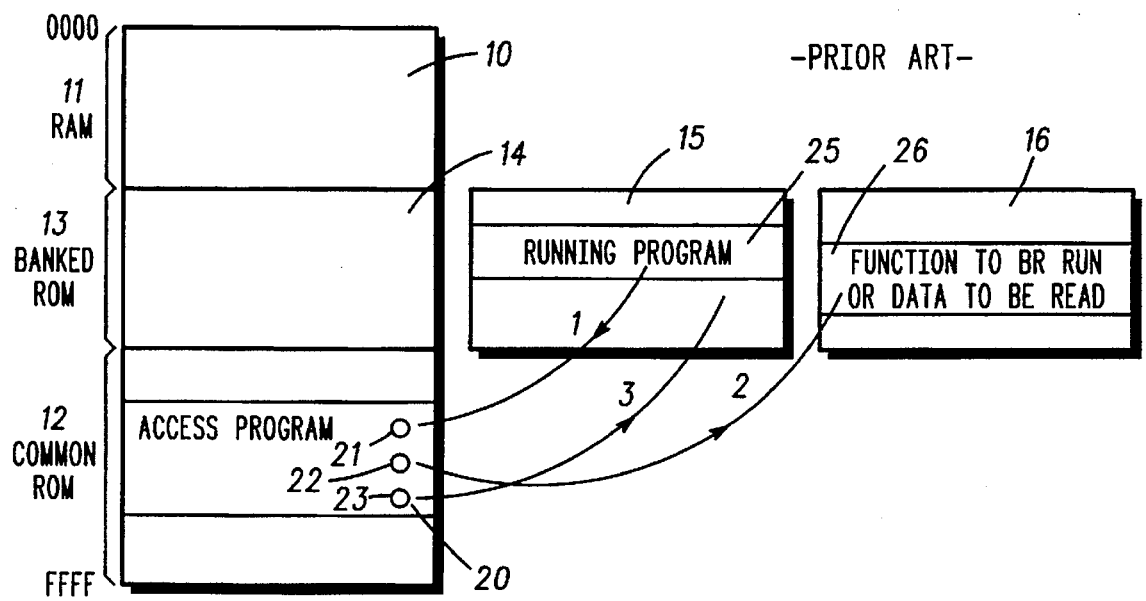
FIG. 1 is a memory map diagram of a bank switched memory arrangement found in the prior art.

Referring to FIG. 1, a memory map, that is to say in an illustration of memory allocation, is shown for a microprocessor found in the prior art. The drawing shows physical address space extending from address 0000 to address FFFF (hexadecimal), that is to say 64K of physical address space. The address space is divided into RAM memory 11 and common ROM memory 12. Physical address space 13 is banked ROM memory space, that is to say the addresses represented by this physical address space are capable of addressing a first bank memory 14 or a second bank memory 15 or a third or subsequent bank memory 16. Within common ROM memory is an access program 20 which contains a start instruction 21, a bank switch instruction and bank switch reverse instruction 22 and a return instruction 23. Stored in banked ROM memory 15, is a program 25 and stored in bank memory 16 is a separate function task or block of data in a fixed memory block 26. In operation, when the program 25 is running and that program wishes to run a function or to read data from memory block 26 in banked memory 16, the running program 25 calls the access program 20 from common ROM memory. The access program switches bank (instruction 22), causing the function residing in memory block 26 to be activated, or the data residing in memory block 26 to be copied to RAM 11, and causing the bank to be switched back again. Instruction 23 causes the access program to return to the running program 25 and the function from memory block 26 is completed (or, in the case where data is to be read, the data can be fetched from RAM 11).

A problem with the above arrangement is that a separate access program 20 needs to be stored for each function or data block to be accessed in different banked ROM memory. These different access programs, though possibly individually quite short, together amount to a substantial expenditure of ROM memory 12.

Figure 2:
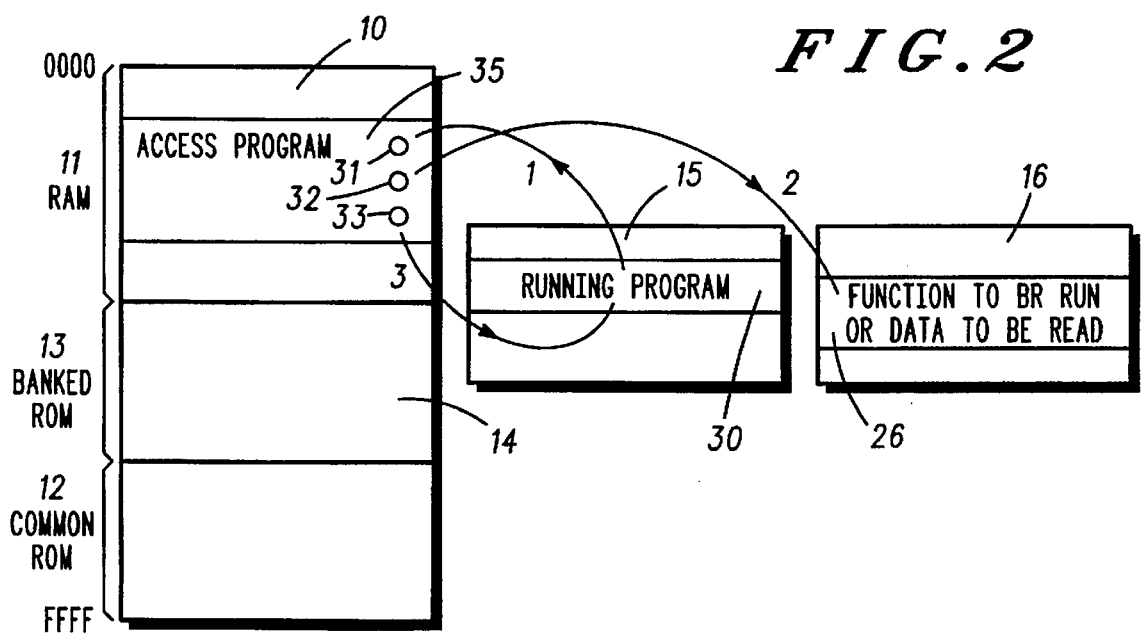
FIG. 2 is a memory map of a device in accordance with the invention.

Referring to FIG. 2, a preferred embodiment of the present invention is shown. In this figure, the physical address space 10 is shown as divided into approximately the same proportions as in the prior art case considered above. These proportions are not critical, but in a typical arrangement, there may be 16K of common RAM, 32K of common ROM and 16K of banked ROM physical address space. The banked ROM physical address space 13 is capable of addressing banked ROM 14 or 15 or 16, or addition banked memory, depending on the setting of a physical bank switch described below.

Stored in banked ROM memory 15 is a program 30, which from time to time, requires the use of a subroutine function or task stored in bank memory 16 or requires data to be read from bank memory 16. This subroutine, function, task or data is stored in a block of memory 26. The program 30 will be referred to as the "running program". This program includes, in one embodiment, a complete access program for accessing memory block 26. This access program includes a start instruction 31, bank switch and reverse switch instructions 32 and a return instruction 33. Running program 30 also includes instructions for loading the access program into RAM memory 11. As shown in the figure, the access program 35 has been loaded into RAM memory 11. The access program 35 is, in preference, loaded into RAM memory 11 at the start of the running program 30, ie. on initiation of that running program.

Figure 3:
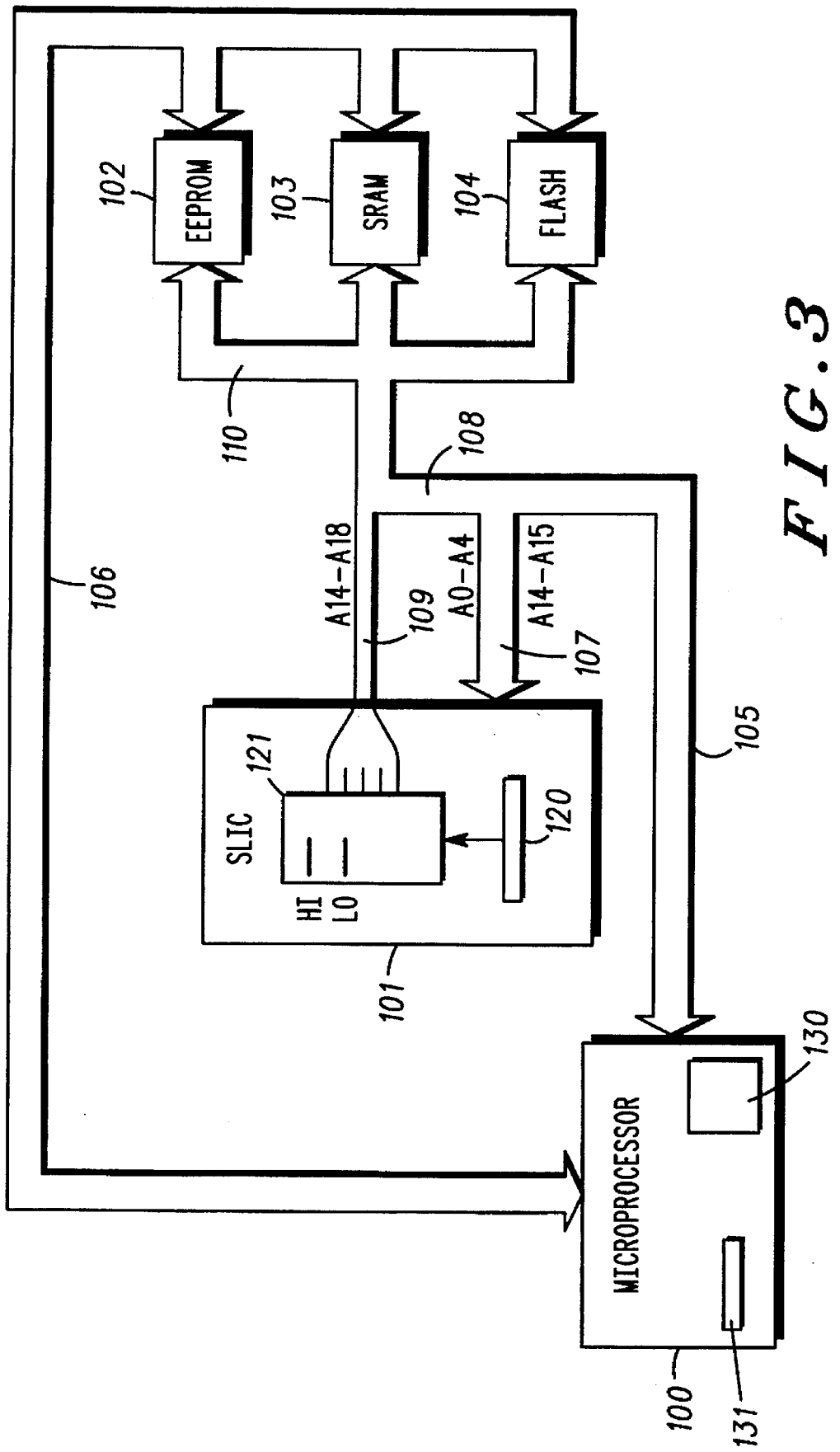
FIG. 3 is a circuit diagram showing a microprocessor and associated circuitry of a device in accordance with the invention.

Referring to FIG. 3, hardware for implementing the above features is shown. It comprises a microprocessor 100, a memory management unit (MMU) or SLIC (eg. a Motorola MDI5000) 101 and a number of memory devices 102, 103 and 104. In the example shown, these memory devices are EEPROM, SRAM and FLASH EPROM respectively. The microprocessor 100, the memory management unit 101 and the memory devices are connected by an address bus 105 and the data bus 106. The address bus 105 has a width of 16 bits at the point where it connects to the microprocessor 100. Referring to these bits as A0 to A15, seven of these bits are used for addressing the memory management unit 10-bits A0 to A4 and A14 to A15, represented by bus 107. In portion 108 of the address bus, bits A0 to A13 pass to the memory devices 102 to 104 and are supplemented by additional bits A14 to A18 from bus 109. Thus in the portions of bus 110, there are 19 bits in the address bus, giving the capacity for addressing of 512K of memory. This is eight times as large as the addressing capacity of the microprocessor 100 by itself.

The memory management unit 101 is a standard device, which comprises registers 120, which need not be described in detail, for storing the bank number of the current bank (13, 15, 16 etc as shown in FIG. 2) to which switching element 121 in memory management unit 101 are switched or are to be switched. Depending on the switching of these switching elements 121, the address bits A14 to A18 are set.

The microprocessor 100 is a standard microprocessor such as a Motorola 68HC11 and is shown as having a stack 130 and a program counter 131. The program counter acts as scheduling means for scheduling the address of the next instruction to be executed.

The circuit shown in FIG. 3 may additionally be provided with input/output devices and other elements standard in the microprocessor field.

Figure 4:
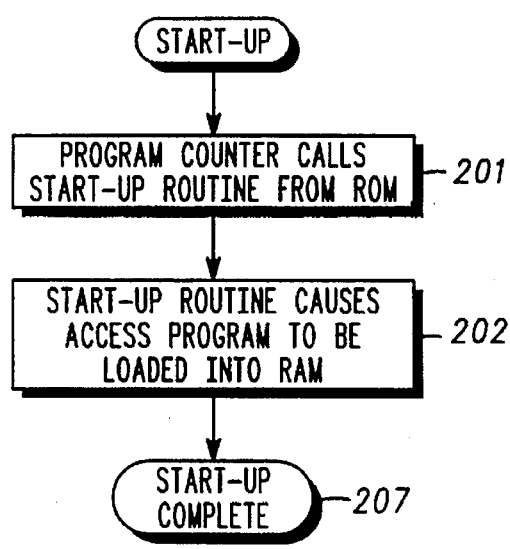
FIG. 4 is a flow diagram of a start-up routine for the microprocessor of FIG. 3.

In an improved arrangement, the instructions of the access program 35 are, on initial start-up of the device, loaded into RAM 11 from a predetermined location on ROM, preferably banked ROM 14. This is illustrated in FIG. 4. On loading of the access program 35, the access program 35 is provided with two objects, that is to say data items on which the program will operate. These objects are (a) the number of the first memory bank to which the access program will switch and (b) the start address in that memory bank of the next running program. These values are predetermined at the start-up. When another program is to be run (FIG. 5), eg. program 30, it loads new objects for access program 35 into RAM 11, ie. a new destination bank to be switched to and a new address in banked ROM address space 13 from which the next function is to be run or data is to be read.

Referring to FIG. 4, a start-up routine is shown. In step 201, the program counter 131 in microprocessor 100 calls an initial program address for calling the start-up routine from ROM, for example banked ROM 13. In step 202, this start-up routine causes an initial access program 35 to be loaded into RAM 11. This access program will serve for all future bank switching operations.

Figure 5:
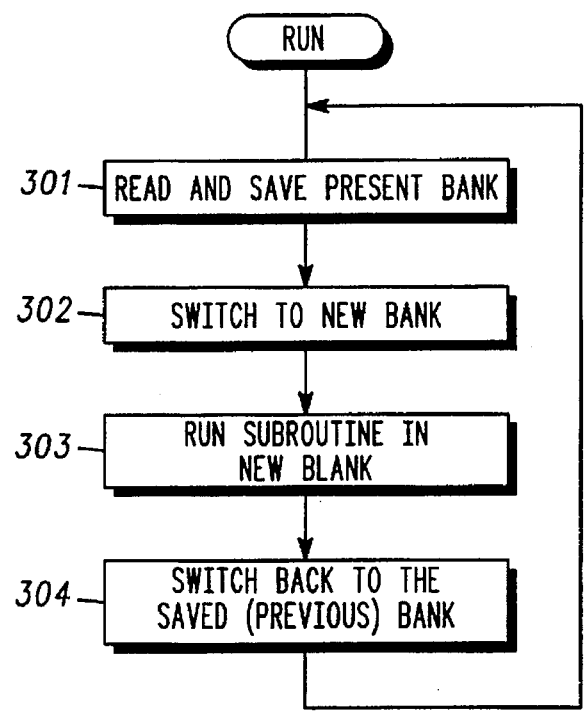
FIG. 5 is a flow diagram for continuous operation of the microprocessor of FIG. 3.

Referring now to FIG. 5, a typical access program run operation is shown, in which, in step 301, the present bank number is read from the MMU 101 and the pervious program address is saved in the stack 130 in microprocessor 100. This is for the purposes of reverting to the previous bank and the previous program. (As an alternative, the access program can include the "home" bank for the running program). In step 302 the MMU 101 switches to a new memory bank, defined by the present running program.

In step 303, a sub-routine is run from the new bank. In this subroutine, there may be many nested bank switching operations. In step 304, there is a bank switching operation to the bank identified by the saved bank number in the stack and the program counter 131 returns to the program address previously saved. After step 304 the complete program has returned to the starting point and can be run again.

By virtue of the saving of the previous bank number in a pushdown, pop-up memory such as a stack, the ability is always retained to return to a program from which a bank switching operation was executed. Only the bank number and the previous address need to be stored in the stack. It is not necessary to store a complete access program for each banked sub-routine.

In the case where the second banked memory 16 contains data for reading, the access program need only comprises the bank number of the second bank, a copy instruction with an address and the bank number of the first bank.

Note that a new function to be run may itself cause the loading of a new access program into RAM 11 or (preferably) new objects for the access program in RAM 11. Many functions can be nested in this manner, each function having the ability to load new access program objects into RAM 11 for calling a sub-nested function or for calling data. In each case, each level of function has the ability to switch back the bank switch to the position immediately previous to the running of that program, for returning to the program from which it was called.

A typical access program for storing in RAM memory 11 for a M68HC11 microprocessor is as follows (no input-values to the subroutine are shown, but a return-value from it is shown).

| access | LDX #$xxxx | ;xxxx = subroutine-address in new bank |
|---|---|---|
|  | LDAB #$yy | ;yy = number of new bank |
|  | LDAA bank_port | ;read present bank |
|  | PSHA | ;save it on stack |
|  | STAB bank_port | ;switch to new bank |
|  | JSR $00,X | ;activate subroutine in new bank |
|  | XGDX | ;save return-value in X-reg (only if subroutine has any) |
|  | PULA | ;fetch old bank from stack |
|  | STAA bank_port | ;switch to old bank |
|  | XGDX | ;get return-value back to A-reg (only if subroutine has any) |
|  | RTS | ;return to calling program. |

The arrangement shown and described can be used for controlling a radio. For example, one running program may be stored in bank 15 for controlling the man-machine-interface, where another program is stored in memory bank 16 for signalling over the air. A point may be reached in the first program at which the user is ready to perform over-the-air signalling, in which case the program in memory bank 15 calls up the program in memory bank 16 and controller returns to memory bank 15 when the signalling is completed.

Many useful and efficient divisions of program tasks can be considered to minimise the switching from bank to bank. The arrangement can be used for many consumer devices such as video recorders, washing machines, vehicle engine management controllers or vehicle accessory management controllers, as well as many other applications.

We claim:

1. An electronic device having a microprocessor, a common random access memory (RAM), a plurality of banked memories and a memory switch for connecting selected ones of the bank switched memories to the microprocessor for addressing by the microprocessor via banked memory address space, wherein:

a first banked memory comprises a first program;

the microprocessor comprises program scheduling means arranged to select and run the first program from the first banked memory;

the first program includes an access program and the access program comprises a bank number of a memory bank and an address for addressing banked memory and further comprising instructions (a) for activating the memory switch to disconnect the first banked memory from the microprocessor and connect a second banked memory (b) for performing memory access operations or program running to or from the banked memory address space and (c) for disconnecting the second banked memory and reconnecting the first banked memory;

instructions stored in banked memory and provided for loading the access program into common RAM;

the scheduler is arranged to run the access program from the common RAM when the access program has been loaded into the common RAM and;

a record is kept in RAM memory of the previous bank number.

2. An electronic device having a microprocessor, a common random access memory (RAM), a plurality of banked memories and a memory switch for connecting selected ones of the bank switched memories to the microprocessor for addressing by the microprocessor via banked memory address space, wherein:

a first banked memory comprises a first program;

the microprocessor comprises program scheduling means arranged to select and run the first program from the first banked memory;

the first program includes an access program and the access program comprises a bank number of a memory bank and an address for addressing banked memory and further comprising instructions (a) for activating the memory switch to disconnect the first banked memory from the microprocessor and connect a second banked memory the second banked memory contains data for reading and the access program comprises the bank number of the second bank, a copy instruction with an address and the bank number of the first bank (b) for performing memory access operations or program running to or from the banked memory address space and (c) for disconnecting the second banked memory and reconnecting the first banked memory;

instructions provided for loading the access program into common RAM;

the scheduler is arranged to run the access program from the common RAM when the access program has been loaded into the common RAM.

* * * * *